(12) United States Patent
Thore et al.

(10) Patent No.: US 9,690,001 B2
(45) Date of Patent: *Jun. 27, 2017

(54) METHOD FOR ESTIMATING ELASTIC PARAMETERS THROUGH INVERSION OF 4D SEISMIC MEASURES

(75) Inventors: Pierre Thore, Pau (FR); Christian Hubans, Pau (FR)

(73) Assignee: TOTAL SA, Courbevoie (FR)

( * ) Notice: Subject to any disclaimer, the term of this patent is extended or adjusted under 35 U.S.C. 154(b) by 657 days.

This patent is subject to a terminal disclaimer.

(21) Appl. No.: 13/811,378

(22) PCT Filed: Jul. 19, 2011

(86) PCT No.: PCT/FR2011/051720
§ 371 (c)(1),
(2), (4) Date: Jan. 21, 2013

(87) PCT Pub. No.: WO2012/010790
PCT Pub. Date: Jan. 26, 2012

(65) Prior Publication Data
US 2013/0121112 A1      May 16, 2013

(30) Foreign Application Priority Data
Jul. 21, 2010 (FR) .................... 10 55945

(51) Int. Cl.
*G01V 1/30* (2006.01)
*G01V 1/28* (2006.01)

(52) U.S. Cl.
CPC .............. *G01V 1/308* (2013.01); *G01V 1/306* (2013.01); *G01V 2210/612* (2013.01); *G01V 2210/6242* (2013.01)

(58) Field of Classification Search
CPC .. G01V 1/306; G01V 1/308; G01V 2210/612; G01V 2210/6242

(Continued)

(56) References Cited

U.S. PATENT DOCUMENTS

| | | | |
|---|---|---|---|
| 4,969,130 A | 11/1990 | Wason et al. | |
| 5,487,001 A | 1/1996 | Neff | |

(Continued)

FOREIGN PATENT DOCUMENTS

| | | |
|---|---|---|
| EP | 1 865 340 A1 | 12/2007 |
| WO | WO 01/33481 A1 | 5/2001 |
| WO | WO 2008/140655 A1 | 11/2008 |

OTHER PUBLICATIONS

"Simulated annealing," Wikipedia, Jul. 11, 2009, downloaded Apr. 4, 2016 from https://en.wikipedia.org/w/index.php?title=Simulated_annealing&oldid=301542324, 8 pp.*

*Primary Examiner* — Daniel L Murphy
(74) *Attorney, Agent, or Firm* — Patterson Thuente Pedersen, P.A.

(57) ABSTRACT

A 4D seismic technique, where a base seismic trace is measured at a first time in a region of the subsoil, and then a monitor seismic trace corresponding to the base seismic trace is measured at a second time. To interpret the 4D measurements, assumptions are made about the variation of elastic parameters in permeable layers at predefined positions in one direction between the first and the second time. Elastic parameters include the density ($\rho$) and the speed of propagation of the pressure waves ($V_P$) in the permeable layers. Numerical evaluation is performed for a capability of each assumption about the variation of elastic parameters to give an account of a change between the measured base seismic trace and the measured monitor seismic trace, and the variation of the elastic parameters is estimated in accordance with an assumption of optimum capability.

15 Claims, 6 Drawing Sheets (58) Field of Classification Search
USPC .......................................... 367/75, 73, 37, 38
See application file for complete search history.

(56) References Cited

U.S. PATENT DOCUMENTS

| | | |
|---|---|---|
| 5,798,982 A | 8/1998 | He et al. |
| 6,321,840 B1 * | 11/2001 | Billiter et al. ................. 166/268 |
| 9,377,549 B2 * | 6/2016 | Thore .................... G01V 1/306 |
| 2002/0013661 A1 | 1/2002 | Van Riel et al. |
| 2008/0291781 A1 * | 11/2008 | Williamson ............. G01V 1/30 367/38 |
| 2010/0004870 A1 | 1/2010 | Tonellot et al. |

* cited by examiner

METHOD FOR ESTIMATING ELASTIC PARAMETERS THROUGH INVERSION OF 4D SEISMIC MEASURES

PRIORITY CLAIM

The present application is a National Phase entry of PCT Application No. PCT/FR2011/051720, filed Jul. 19, 2011, which claims priority from French Application Number 10 55945, filed Jul. 21, 2010, the disclosures of which are hereby incorporated by reference herein in their entirety.

BACKGROUND OF THE INVENTION

The present invention relates to the geophysical methods employed to estimate parameters of the subsoil, notably in the context of hydrocarbon exploration and production.

It relates more particularly to the so-called 4D seismic techniques. In these techniques, there are first seismic recordings, obtained in a first phase during a campaign of "base" measurements ("base survey"), for example before a hydrocarbon reservoir is placed in production, and there is a subsequent campaign of measurements ("monitor survey"), for example after a few years of operation of the reservoir, to obtain second seismic recordings. The base and monitor seismic recordings (or seismic traces) are compared to estimate variations of physical parameters of the geological layers in the area explored.

The parameters of which the variations are thus estimated may comprise the density $\rho$, the speed $V_P$ of propagation of the pressure waves (P waves) and the speed $V_S$ of propagation of the shear waves (S waves) in the media forming the various geological layers of the area explored. Reference is often made to the seismic impedances in each medium, $I_P = \rho \times V_P$ and $I_S = \rho \times V_S$, which govern the propagation of the P waves and S waves in the layers. Because of the changes linked to oil production, for example the replacement of oil with water or gas, the parameters $\rho$, $V_P$, $V_S$ are modified in certain layers. This results in changes of amplitude in the seismic recordings, and in time offsets in the recorded seismic traces. The comparative analysis of the recordings comprises an inversion to estimate the variations of the parameters in order to obtain an idea of the levels of saturation in the layers being operated.

An inversion method that can be used to analyze the time offsets in the base and monitor seismic traces (dependant on the variations of propagation speeds) at the same time as the changes of amplitude (dependant on the impedance variations) is described in EP 1 865 340 A1.

A 3D seismic technique, i.e. a technique based on a single survey, taking into account well logs is described in the U.S. Pat. No. 5,798,982, which also mentions an extension of the technique to 4D seismic by a comparison of inverted seismic blocks.

Another 4D seismic data analysis method, described in WO 2008/140655 A1, uses a model-based inversion in one or more wells where logs have been recorded. The document does not describe the inversion method or the way in which the model is parameterized. The results of the inversion are then extended by moving away from the well, using a statistical method. A correlation computation is performed in order to relate the time reference of the monitor recordings to that of the base recordings. With the model used, the method seeks to directly estimate variations of saturation levels and pressure variations in the geological layers.

An object of the invention is to add to the 4D seismic techniques, notably by making them take into account geological and dynamic constraints.

SUMMARY OF THE INVENTION

There is proposed a method for estimating elastic parameters of a region of the subsoil, comprising:
measuring at least one base seismic trace in a first phase;
measuring, in a second phase, at least one monitor seismic trace corresponding to the base seismic trace;
making assumptions of variation of elastic parameters in permeable layers of predefined positions along a direction between the first and the second phases, the elastic parameters including a density and a speed of propagation of pressure waves in each of said permeable layers;
numerically evaluating a capacity of each assumption of variation of elastic parameters to account for an evolution between the measured base seismic trace and the measured monitor seismic trace;
estimating the variation of the elastic parameters in accordance with an assumption having an optimum evaluated capacity.

The technique uses a geological-dynamic a priori to estimate the 4D parameters on the reservoir scale. This estimation is performed along a predefined direction, generally vertical. It can be the direction of a well drilled in the area studied or, in certain situations, a direction chosen arbitrarily without having to be located along a well.

When the propagation speeds that are being estimated are limited to the speed of propagation of the pressure waves $V_P$, the base and monitor seismic traces can be measured by sending seismic waves at normal incidence toward layers following one another along said direction and by collecting the seismic waves reflected by interfaces between said layers. The method can also be extended to the estimation of the speeds of propagation of the shear waves in the permeable layers, the base and monitor seismic traces then being measured by sending seismic waves at non-normal incidence toward layers following one another along said direction and by collecting the seismic waves reflected by the interfaces between said layers. The elastic parameters of which the variations are being tested can also include the position, along said direction, of at least one interface delimiting one of said permeable layers.

In one embodiment of the method, the variations of elastic parameters are taken into account in permeable layers along a well drilled in the subsoil. The permeable layers are typically positioned along said direction, which is then the direction of drilling of the well, on the basis of measurements (logs) performed in the well. Another possibility, if the well is in operation, is to define the positions of the permeable layers along the well on the basis of positions of perforations made in a casing of the well.

For a well that is in operation, it is commonplace to have available a reservoir grid that is used by the reservoir engineers to predict production. A reservoir grid is constructed by a geomodeling technique based on structural information derived from the seismic recordings and from the wells. This grid is filled with the physical properties of the rocks, notably the permeability and porosity, calibrated on the well data. Typically, a certain number of wells are drilled in the area placed in operation, and the data obtained from the logs are interpolated between wells to establish a first grid which is then refined using seismic recordings. In the context of the present invention, the reservoir grid can be used to provide the geological a priori used in the 4D inversion.

The positions of the permeable layers along the above-mentioned direction are then defined on the basis of the reservoir grid. It should be noted that this makes it possible to implement the method in a well, the values of elastic parameters for which the variations are being tested being those located along the well in the reservoir grid, but also in the absence of wells. In this latter case, the permeable layers where the elastic parameters are estimated are those that said direction encounters in the reservoir grid. If the resolution of the reservoir grid is too fine, it is possible to aggregate a plurality of layers thereof in a single permeable layer taken into account in the 4D inversion.

A certain number of approaches are possible for the numerical evaluation of the capacity of an assumption of variation of elastic parameters to account for the evolution between the measured base seismic trace and the measured monitor seismic trace.

When the elastic parameters are estimated along a well, it is possible to obtain, for each assumption of variation, values of the elastic parameters in the well for the second phase on the basis of values of the elastic parameters measured in the well in the first phase (logs). According to one approach, a simulated base seismic trace is computed on the basis of a wavelet representative of an incident seismic signal and of the values of the elastic parameters measured in the well in the first phase, a simulated monitor seismic trace is computed on the basis of said wavelet and of the values of the elastic parameters in the well obtained for the second phase, and the difference between the measured monitor seismic trace and the measured base seismic trace is compared with the difference between the simulated monitor seismic trace and the simulated base seismic trace. If the comparison reveals that a predetermined condition is fulfilled (for example, the difference between the two trace differences is below a threshold, or is the lowest observed for a set of assumptions of variation tested), the assumption of variation that is considered to have an optimum capacity is retained for the estimation of the elastic parameters in the second phase (monitor).

In another approach, an amplitude perturbation of the measured base seismic trace resulting from a change of the elastic parameters in the well from the values measured in the first phase to the values obtained for the second phase is estimated, a seismic pseudo-trace is computed by combining one of the measured seismic traces with the estimated amplitude perturbation, and, on a same timescale, the other one of the measured seismic traces is compared with the computed seismic pseudo-trace. The result of the comparison can then be used to decide on the estimation of the elastic parameters.

The estimation of the perturbation in amplitude can use the logs recorded before the well is put into operation (base time). It then comprises the computation of a simulated base seismic trace on the basis of a wavelet representative of an incident seismic signal and of the values of the elastic parameters measured in the well in the first phase, the computation of a simulated monitor seismic trace on the basis of said wavelet and of the values of the elastic parameters in the well obtained for the second phase, the simulated base and monitor seismic traces being computed with one and the same depth-time conversion law, and a subtraction between the simulated base seismic trace and the simulated monitor seismic trace to obtain the estimated amplitude perturbation.

Yet another approach can be adopted with or without the presence of a well. It consists in estimating a perturbation in amplitude of the measured base seismic trace resulting from the variation of the elastic parameters, in computing a seismic pseudo-trace by combining one of the measured seismic traces with the estimated amplitude perturbation, and in comparing, on one and the same timescale, the other of the measured seismic traces with the computed seismic pseudo-trace. The amplitude perturbation can be estimated approximately as a function of impedance variations in the permeable layers, deduced from the assumption of variation of the elastic parameters, and from a wavelet representative of an incident seismic signal.

In one embodiment, the capacity of an assumption of variation of elastic parameters to account for the evolution between the measured base seismic trace and the measured monitor seismic trace is evaluated numerically by relating to the base reference frame the monitor seismic trace deformed as a function of the assumptions of variation of the elastic parameters. The measured seismic trace that is combined with the estimated amplitude perturbation for the computation of the seismic pseudo-trace is then the measured monitor seismic trace, and the combination comprises modifying the timescale of the measured monitor seismic trace to take into account the variation of speed of propagation of the seismic waves in accordance with the assumption of variation of elastic parameters, and obtaining the seismic pseudo-trace by subtracting the estimated amplitude perturbation from the modified measured monitor seismic trace.

BRIEF DESCRIPTION OF THE DRAWINGS

Other features and advantages of the present invention will become apparent in the following description of a nonlimiting exemplary embodiment, with reference to the appended drawings, in which.

DESCRIPTION OF EMBODIMENTS

Figure 1:
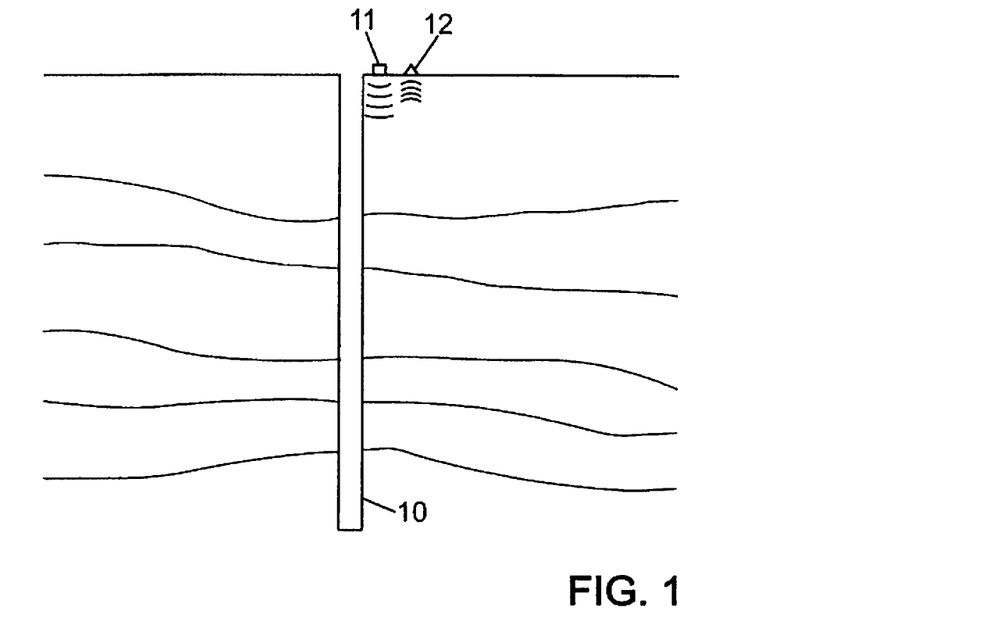
FIG. 1 is a diagram illustrating a seismic measurement mode near a well.

FIG. 1 illustrates an oil production area where a well 10 has been drilled. This well 10 passes through layers, represented very diagrammatically in FIG. 1, that have variable elastic parameters.

Figure 2:
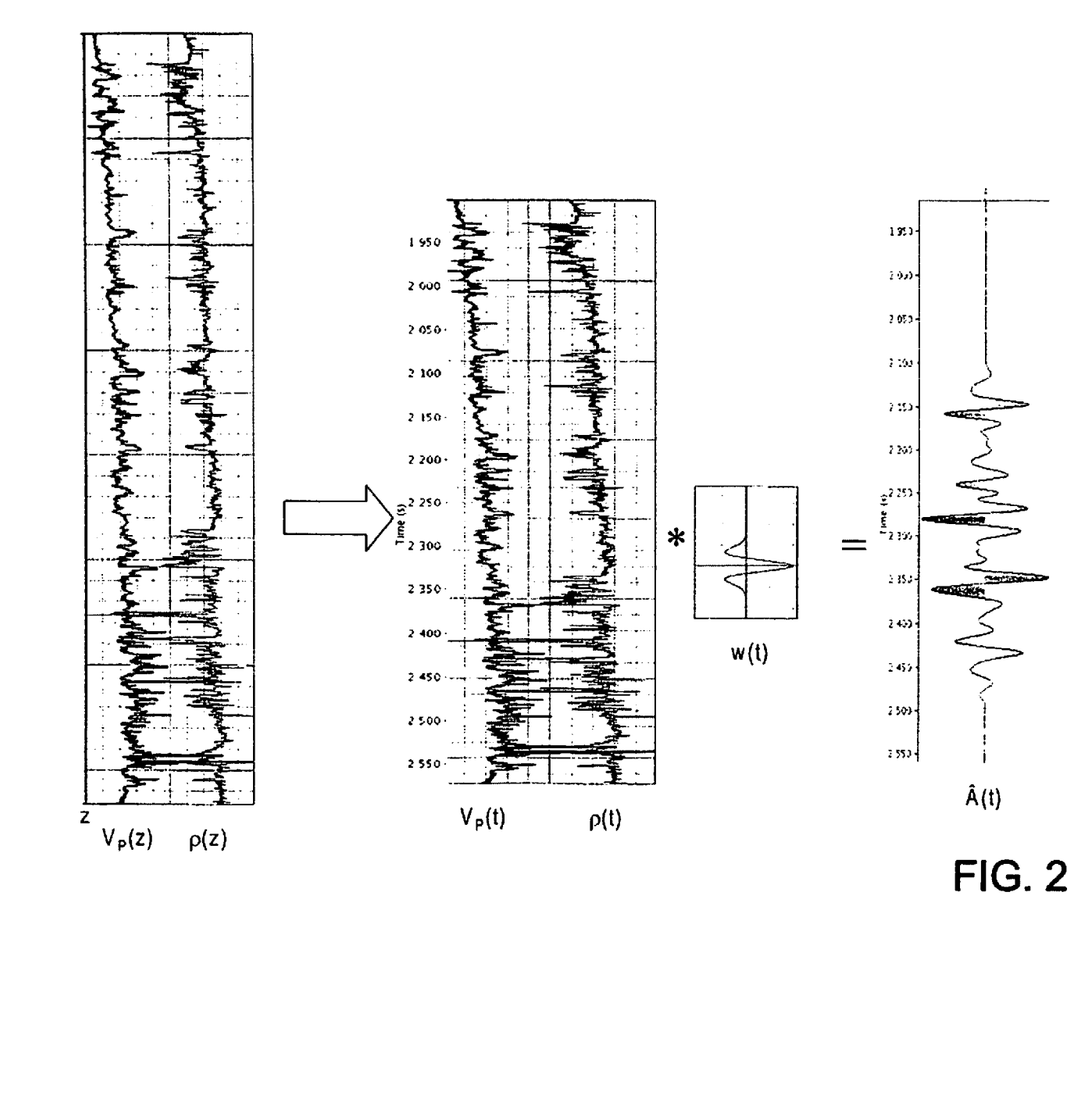
FIG. 2 is a diagram illustrating synthesis of a seismic trace on the basis of measurements performed in a well (logs)

Before the casing of the well is put in place, a number of measurements (logs) have been carried out therein in order to know, with a resolution of the order of a few tens of centimeters, the values of different physical parameters of the rocks passed through by the well. These parameters notably include the porosity, the permeability, the density and the speed of propagation of the pressure waves. The left hand part of FIG. 2 shows an exemplary recording of the speed $V_P$ of propagation of the pressure waves and of the density $\rho$ of the rocky formations as a function of depth along the well.

In a seismic survey in the region considered, a source of seismic waves 11 is successively placed at different places on the surface, or in the sea in the case of an offshore area, and one or more seismic wave detectors 12 collect the seismic waves originating from the source 11 which are reflected on the interfaces between the geological layers encountered. FIG. 1 illustrates the particular case in which the source 11 and the detector 12 are placed in immediate proximity to the well 10 in order to record seismic waves which are propagated vertically along the well with an approximately normal incidence on the interfaces between layers.

In this configuration, the amplitude of the seismic signal collected by the detector 12 can be modeled by a convolution of the seismic impedance $I_P = \rho \times V_P$ relative to the pressure waves with a wavelet $w(t)$ representing the wave form of the signal emitted by the source 11:

$$\hat{A}(t) = \sum_{\tau} \rho(\tau) \cdot V_P(\tau) \cdot w(t - \tau) = I_P(t) * w(t) \qquad (1)$$

This modeling is illustrated by FIG. 2 where the first step consists in converting the logs $V_P(z)$, $\rho(z)$ obtained as a function of the depth in the well into logs $V_P(t)$, $\rho(t)$ expressed as a function of the propagation time of the waves to be able to be convolved according to (1). The depth-time conversion law used for that is directly deduced from the evolution of the speed $V_P$ along the well. The convolution of the impedance $I_P = \rho \times V_P$ by the wavelet $W(t)$ makes it possible to synthesize a seismic trace $\hat{A}(t)$ represented in the right hand part of FIG. 2.

In general, it is possible to obtain the profile of the parameters $V_P$ and $\rho$ along the well using the logs initially performed, i.e. performed in the base time. However, in the 4D seismic monitor time (typically a few years after the base time), there is no longer access to the wall of the well to be able to measure therein the values of $V_P$ and $\rho$ which might have changed because of the production.

However, assumptions can be formulated as to the variations $\Delta V_P$ and $\Delta \rho$ of the parameters between the base time and the monitor time and the capacity of these assumptions of variation to account for the modifications of the seismic traces recorded in conditions similar to the base time and to the monitor time can be tested. It is convenient to express these parameter variations in a relative manner, namely in the form $\Delta V_P/V_P$ and $\Delta \rho/\rho$.

In general, it is in the permeable layers encountered along the well that the parameters $V_P$ and $\rho$ will have changed most significantly because it is in these layers that the oil extracted from the subsoil flows during operation. In the left hand part of FIG. 3, two permeable layers 20, 30 are represented in which the speed $V_P$ and the density $\rho$ have been able to change between the base time and the monitor time, an assumption of variation $\Delta V_P/V_P$ and $\Delta \rho/\rho$ being indicated in these layers (in practice, the number of these layers is much greater than 2). It is then possible to synthesize a simulated base seismic trace $\hat{A}_B(t)$ and a simulated monitor seismic trace $\hat{A}_M(t)$:

$$\hat{A}_B(t) = \sum_{\tau} \rho(\tau) \cdot V_P(\tau) \cdot w(t - \tau) \qquad (2)$$

-continued
$$\hat{A}_M(t) = \sum_{\tau} [\rho(\tau) + \Delta\rho(\tau)] \cdot [V_P(\tau) + \Delta V_P(\tau)] \cdot w(t - \tau) \qquad (3)$$
$$= \sum_{\tau} \rho(\tau) \cdot V_P(\tau) \cdot \left[1 + \frac{\Delta\rho}{\rho}(\tau)\right] \cdot \left[1 + \frac{\Delta V_P}{V_P}(\tau)\right] \cdot w(t - \tau)$$

The change in the density $\rho$ and the speed $V_P$ as a result of the oil production has two effects on the modeling:
a change in the depth-time relationship used for the conversion of the logs $\rho(z) \rightarrow \rho(t)$ and $V_P(z) \rightarrow V_P(t)$;
a change of amplitude due to the change of impedance as indicate by the above formula (3).

From these expressions (2) and (3), it is possible to check whether the assumption of variation $\Delta V_P/V_P$ and $\Delta \rho/\rho$ properly accounts for the evolution observed between two seismic traces $A_B(t)$, $A_M(t)$ successively measured at the base time and at the monitor time.

Figure 4:
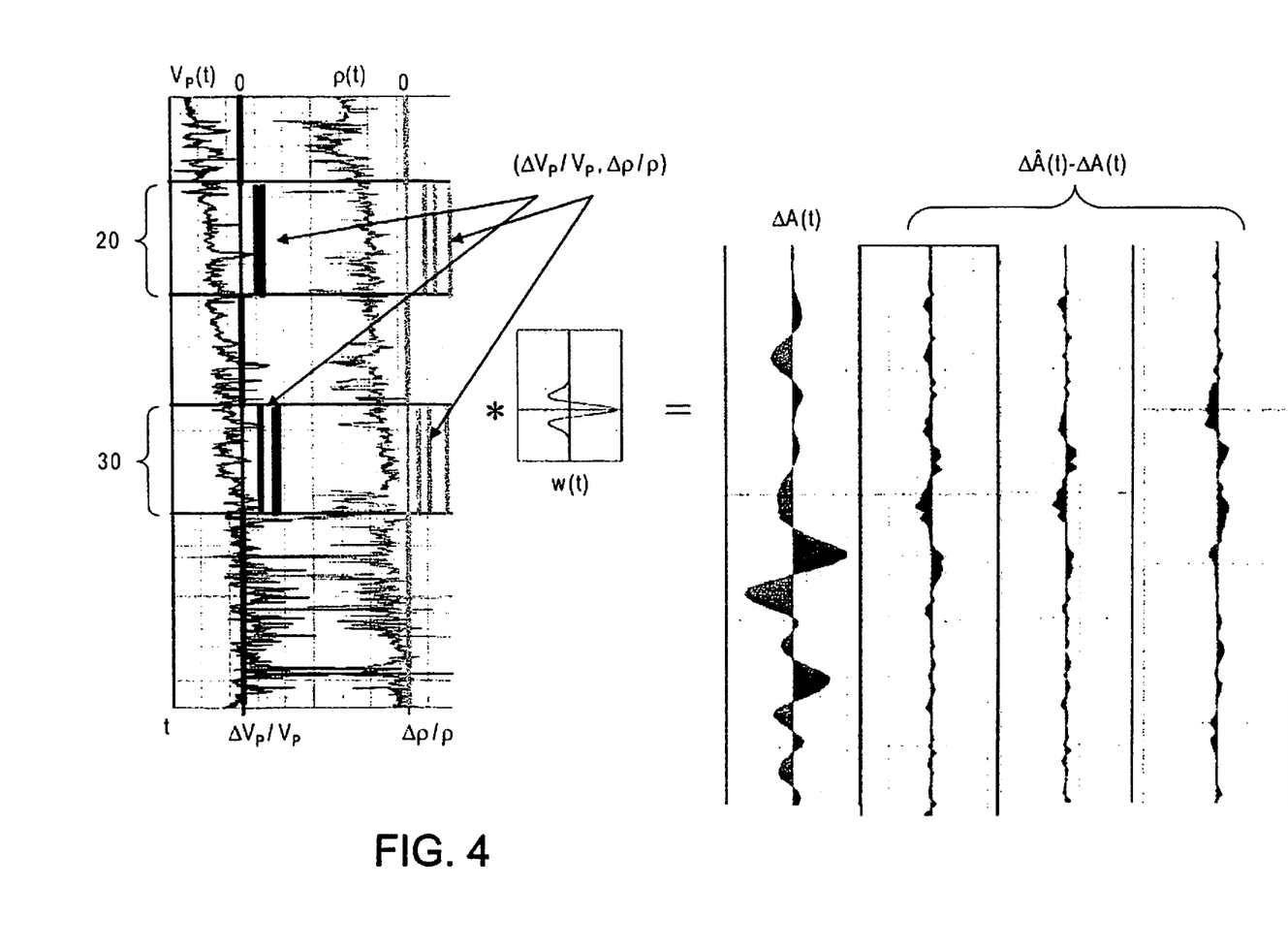
FIG. 4 is a diagram illustrating a first embodiment of the method for estimating elastic parameters according to the invention.

FIG. 4 illustrates a first way of carrying out this check. The left hand part of FIG. 4 shows the logs $V_P(t)$ and $\rho(t)$ measured as a function of the depth at the base time and converted to be expressed as a function of the propagation time, as well as a number of assumptions $\Delta V_P/V_P$, $\Delta \rho/\rho$ of variation of the parameters in the permeable layers 20, 30.

Figure 3:
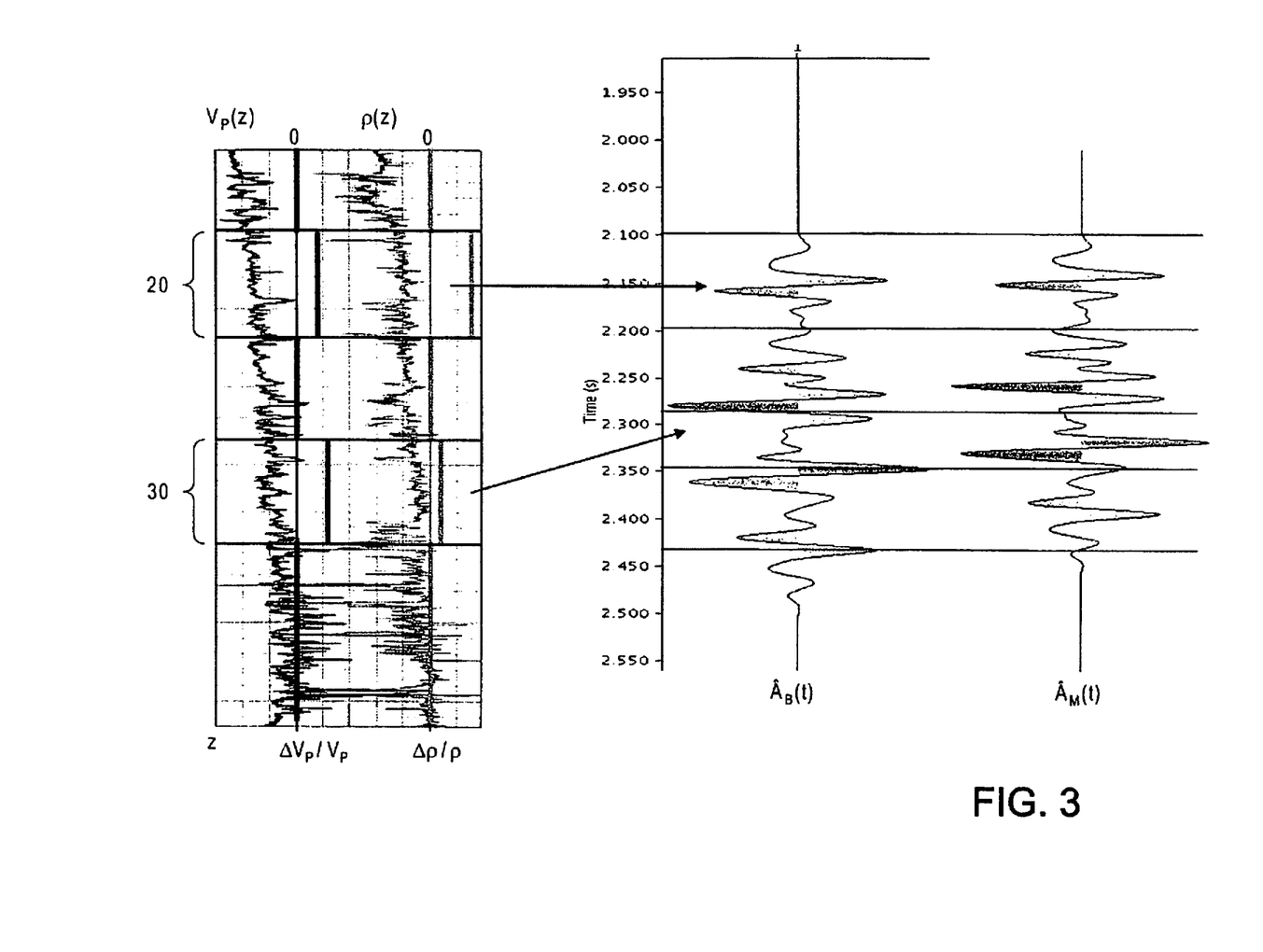
FIG. 3 is a diagram illustrating the evolution from a base seismic trace to a monitor seismic trace as a function of an assumption of variation of the density and of the speed of propagation of the pressure waves in the permeable layers along the well.

Using the scheme illustrated by FIG. 3, base and monitor simulated seismic traces $\hat{A}_B(t)$, $\hat{A}_M(t)$ are obtained, then their difference $\Delta \hat{A}(t) = \hat{A}_M(t) - \hat{A}_B(t)$ is computed. This difference $\Delta \hat{A}(t)$ is compared to the difference $\Delta A(t) = \Delta A_M(t) - A_B(t)$ between the measured base and monitor traces. The difference $\Delta \hat{A}(t) - \Delta A(t)$ is minimized as a function of the assumptions of variation $\Delta V_P/V_P$, $\Delta \rho/\rho$ in order to select the assumption which accounts best for the evolution in the seismic trace. The optimization may consist in scanning a large number of assumptions $\Delta V_P/V_P$, $\Delta \rho/\rho$ and in retaining the one that provides the smallest average value of $|\Delta \hat{A}(t) - \Delta A(t)|$ or $[\Delta \hat{A}(t) - \Delta A(t)]^2$, or which minimizes another distance measurement between $\Delta \hat{A}(t)$ and $\Delta A(t)$. Another possibility is to select an assumption $\Delta V_P/V_P$, $\Delta \rho/\rho$ when the time average of $|\Delta \hat{A}(t) - \Delta A(t)|$ is below a predefined threshold.

Various minimization algorithms can be applied, for example genetic or simulated annealing algorithms, which do not require any computation of gradients and are not trapped in local minima.

The cost function $|\Delta \hat{A} - \Delta A|$ is not necessarily the best for performing the optimization in as much as the synthetic base trace often has an appearance that is quite different from the measured base trace. In practice, it is often more appropriate to transform one of the measured traces into the reference frame of the other trace for each assumption of variation before proceeding with a distance computation between these two traces.

Figure 5:
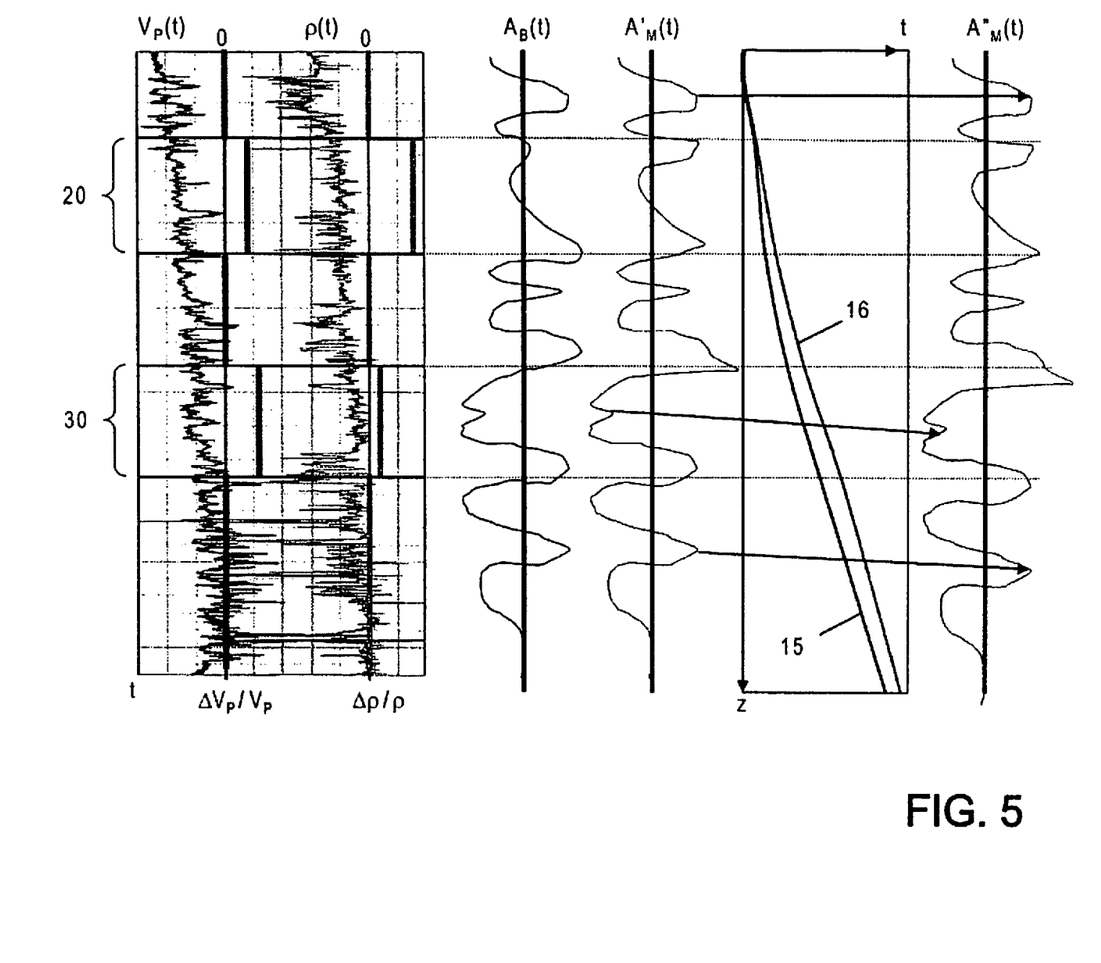
FIGS. 5 and 6 are diagrams illustrating two other embodiments of the method.

Such an embodiment is illustrated by FIG. 5, which shows, in the left hand part, logs $V_P(t)$, $\rho(t)$ as a function of time and an assumption $\Delta V_P/V_P$, $\Delta \rho/\rho$ of variation of the parameters in the permeable layers 20, 30. FIG. 5 also shows a base seismic trace $A_B(t)$ measured before the well is put into production.

From the logs $V_P(z)$ and $\rho(z)$ and the assumptions of variation $\Delta V_P/V_P$, $\Delta \rho/\rho$, a base synthetic trace $\hat{A}_B(t)$ and a base monitor synthetic trace $\hat{A}_M(t)$ are computed by applying the formulae (2) and (3) above. However, before applying the formula (3), the depth-time conversion law applicable to the base time (curve 15 in the z, t diagram of FIG. 5) is used to convert the values $$V_P(z) \cdot \left[1 + \frac{\Delta V_P}{V_P}(z)\right], \rho(z) \cdot \left[1 + \frac{\Delta \rho}{\rho}(z)\right]$$

expressed as a function of depth into values $$V_P(t) \cdot \left[1 + \frac{\Delta V_P}{V_P}(t)\right], \rho(t) \cdot \left[1 + \frac{\Delta \rho}{\rho}(t)\right]$$

expressed as a function of the propagation time. The difference $\Delta\hat{A}(t) = \hat{A}_M(t) - \hat{A}_B(t)$ between the two synthetic traces is then computed in the time reference frame of the base. This difference $\Delta\hat{A}(t)$ is then added to the measured base seismic trace $A_B(t)$ to obtain a first monitor pseudo-trace $A'_M(t)$ represented in FIG. 5: $A'_M(t) = A_B(t) + \Delta\hat{A}(t)$.

This pseudo-trace $A'_M(t)$ is expressed in the time reference frame of the base time. The timescale must be modified to relate the pseudo-trace to the time reference frame of the monitor time and thus obtain a second pseudo-trace $A''_M(t)$ represented in the right hand part of FIG. 5. The change of timescale is performed in such a way as to compensate for the difference between the depth-time conversion law applicable to the base time (curve 15) and the depth-time conversion law applicable to the monitor time (curve 16).

In the embodiment of FIG. 5, the optimization uses a cost function given by the difference between the measured monitor seismic trace $A_M(t)$ and the seismic pseudo-trace $A''_M(t)$ computed in the manner described previously, for example the sum of the squares or the sum of the absolute values of this difference.

It should be observed that there are a number of ways of relating one of the traces to the reference frame of the other by taking into account an assumption of variation of the parameters in order to perform the optimization. An advantageous embodiment starts from the measured monitor seismic trace to relate it to the reference frame of the base seismic trace. In particular, it is possible to begin by modifying the timescale of the measured monitor seismic trace $A_M(t)$ to relate it to the scale applicable to the base time (compensation of the difference between the curves 15 and 16). Then, the difference $\Delta\hat{A}(t)$ computed as previously is subtracted from the pseudo-trace obtained to obtain a pseudo-trace $A''_B(t)$ expressed in the time reference frame associated with the base time. The cost function involved in the optimization is then given by the difference between this pseudo-trace $A''_B(t)$ and the measured base seismic trace $A_B(t)$.

Figure 6:
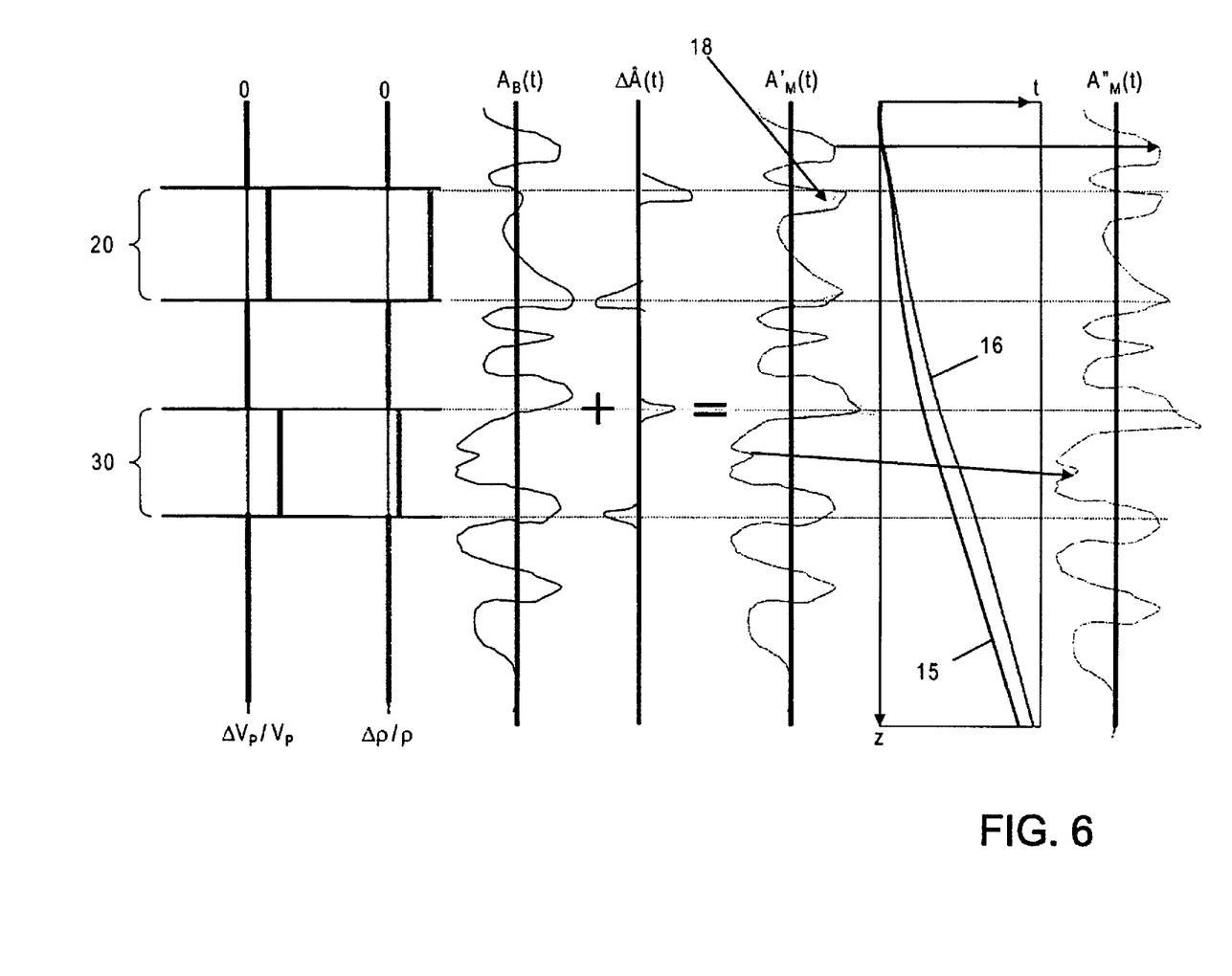

FIG. 6 illustrates an alternative embodiment implementing an approximate method inspired by that of FIG. 5. In this approximate method, no measured log is taken into consideration. Consequently, this method can be applied independently of a well. It is notably applicable for searching for the evolution of the parameters $V_P$, $\rho$ in geological layers whose positioning along a typically vertical direction is determined as a function of the reservoir grid determined for the operation of the area considered.

In the method illustrated by FIG. 6, the modification $\Delta\hat{A}(t)$ of the base seismic trace expressed in the reference frame of the base time is not computed on the basis of measured logs using the above formulae (2) and (3). It is expressed directly as a function of the impedance variation $\Delta I_P/I_P$ corresponding to the assumption of variation of the propagation speed $V_P$ and of the density $\rho$:

$$\Delta I_P/I_P \approx \Delta V_P/V_P + \Delta\rho/\rho \qquad (4)$$

The relative variation of amplitude $\Delta\hat{A}/A$ is estimated in an approximate manner as being proportional to the relative impedance variation $\Delta I_P/I_P$, the proportionality coefficient being the amplitude of the wavelet w(t) representing the incident seismic signal.

Based on the perturbation $\Delta\hat{A}(t)$ computed in an approximate manner, the method illustrated by FIG. 6 continues by computing a first monitor pseudo-trace $A'_M(t) = A_B(t) + \Delta\hat{A}(t)$. As in the method illustrated by FIG. 5, a second pseudo-trace $A''_M(t)$ is computed by a change of timescale to be compared to the measured monitor seismic trace $A_M(t)$. The result of the comparison is then used as cost function for the optimization.

In FIG. 6, the trace 18 represented by dotted lines corresponds to the first pseudo-trace $A'_M(t)$ computed without approximation in the manner described with reference to FIG. 5. It can be seen that the approximate pseudo-trace differs slightly from the latter around the edges of the permeable layers.

In the case where the seismic waves are sent at normal incidence toward the layers studied and are collected with no significant lateral offset between the source 11 and the detector 12, the speed of propagation of the pressure waves $V_P$ and the density $\rho$ are sufficient to model the propagation of the waves sensed by the detector 12.

Figure 7:
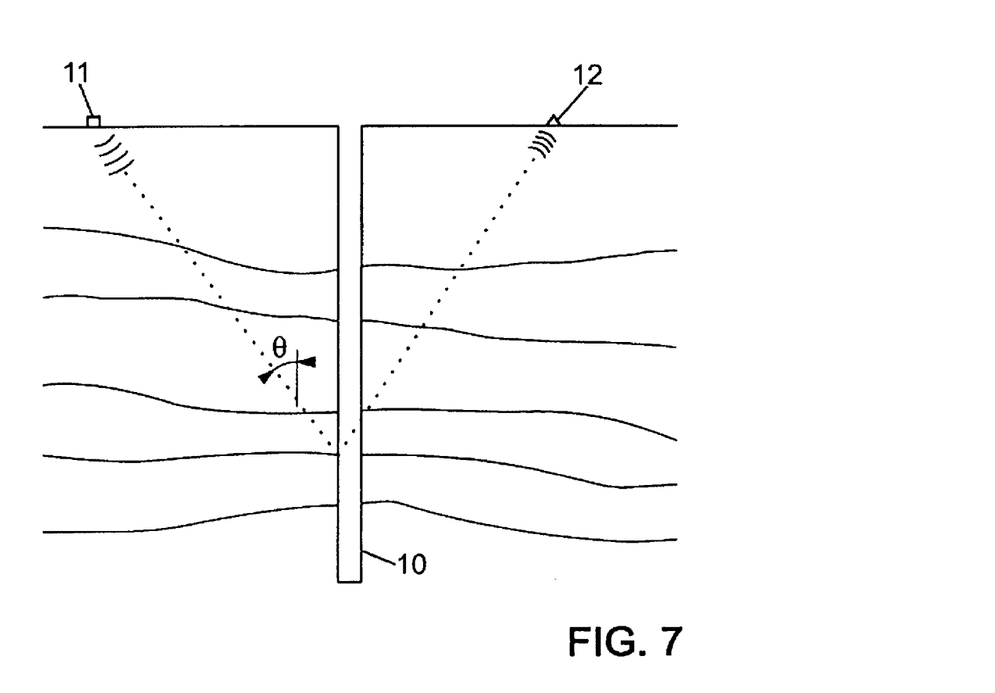
FIG. 7 is a diagram illustrating another way of acquiring a seismic trace that can be used in an embodiment of the method.

The method described above is also applicable in the case where an offset exists between the source 11 and the detector 12 as represented in FIG. 7.

In this latter case, the impedance variation $\Delta I_P/I_P$ involved in the approximate method illustrated by FIG. 6 depends also on the speed of propagation of the shear waves $V_S$ through the angle $\theta$ of incidence of the wave on the interface:

$$\Delta I_P/I_P = \Delta\rho/\rho + [\Delta V_P/V_P]/\cos^2\theta - (2V_S/V_P)^2 \cdot [2\Delta V_S/V_S + \Delta\rho/\rho] \cdot \sin^2\theta \qquad (5)$$

It can then be seen that it is possible to include the speed $V_S$ of propagation of the shear waves in the elastic parameters taken into account in the assumptions of variation. The method therefore gives access to estimations of the speed $V_S$. One possibility is to evaluate $V_P$ and $\rho$ in a first step on the basis of seismic traces recorded at normal incidence (FIG. 1), and to then make assumptions of variation of the parameters $V_S$ alone to perform the optimization as a function of this parameter in a second step on the basis of seismic traces recorded with offset.

The method described above in different embodiments takes advantage of geophysical information (the seismic traces) and of information commonly available to the reservoir engineers (the layer modeling of the subsoil). It provides a novel way of analyzing 4D seismic data that makes it possible to take into account a priori information as to the geological and dynamic behavior of the area studied.

It will be understood that the invention is not limited to the particular embodiments which have been described above, numerous variants being able to be conceived without departing from the scope defined by the attached claims.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for estimating elastic parameters of a region of the subsoil, comprising:
measuring at least one base seismic trace in a first phase;
measuring, in a second phase, at least one monitor seismic trace corresponding to the base seismic trace;
making assumptions of variation of elastic parameters in permeable layers of predefined positions along a direction between the first and the second phases, the elastic parameters including a density ($\phi$) and a speed of propagation of pressure waves ($V_P$) in each of said permeable layers;
numerically evaluating a capacity of each assumption of variation of elastic parameters to account for an evolution between the measured base seismic trace and the measured monitor seismic trace; and
estimating the variation of the elastic parameters in accordance with an assumption having an optimum evaluated capacity.

2. The method as claimed in claim 1, wherein the base and monitor seismic traces are measured by sending seismic waves at normal incidence toward layers following one another along said direction and by collecting the seismic waves reflected by interfaces between said layers.

3. The method as claimed in claim 1, wherein the base and monitor seismic traces are measured by sending seismic waves at non-normal incidence toward layers following one another along said direction and by collecting the seismic waves reflected by the interfaces between said layers, and wherein the elastic parameters also include a speed of propagation of shear waves ($V_S$) in the permeable layers along said direction.

4. The method as claimed in claim 1, wherein the elastic parameters further include the position, along said direction, of at least one interface delimiting one of said permeable layers.

5. The method as claimed in claim 1, wherein the variations of elastic parameters are taken into account in permeable layers along a well drilled in the subsoil.

6. The method as claimed in claim 5, wherein the positions of the permeable layers along the well are defined on the basis of measurements performed in the well.

7. The method as claimed in claim 5, wherein the positions of the permeable layers along the well are defined on the basis of positions of perforations made in a casing of the well.

8. The method as claimed in claim 5, wherein the numerical evaluation of the capacity of an assumption of variation of elastic parameters to account for the evolution between the measured base seismic trace and the measured monitor seismic trace comprises:
computing a simulated base seismic trace on the basis of a wavelet representative of an incident seismic signal and of values of the elastic parameters measured in the well in the first phase;
obtaining values of the elastic parameters in the well for the second phase on the basis of the values measured in the well in the first phase and of said assumption of variation;
computing a simulated monitor seismic trace on the basis of said wavelet and of the values of the elastic parameters in the well obtained for the second phase; and
comparing a difference between the measured monitor seismic trace and the measured base seismic trace with a difference between the simulated monitor seismic trace and the simulated base seismic trace.

9. The method as claimed in claim 5, wherein the numerical evaluation of the capacity of an assumption of variation of elastic parameters to account for the evolution between the measured base seismic trace and the measured monitor seismic trace comprises:
obtaining values of the elastic parameters in the well for the second phase on the basis of values of the elastic parameters measured in the well in the first phase and of said assumption of variation;
estimating a perturbation in amplitude of the measured base seismic trace resulting from a change of the elastic parameters in the well from the values measured in the first phase to the values obtained for the second phase;
computing a seismic pseudo-trace by combining one of the measured seismic traces with the estimated amplitude perturbation; and
comparing, on a same timescale, the other one of the measured seismic trace with the computed seismic pseudo-trace.

10. The method as claimed in claim 9, wherein the estimation of the amplitude perturbation comprises:
computing a simulated base seismic trace on the basis of a wavelet representative of an incident seismic signal and of values of the elastic parameters measured in the well in the first phase;
computing a simulated monitor seismic trace on the basis of said wavelet and of values of the elastic parameters in the well obtained for the second phase, the simulated base and monitor seismic traces being computed with a same depth-time conversion law; and
subtracting the simulated base seismic trace from the simulated monitor seismic trace to obtain the estimated amplitude perturbation.

11. The method as claimed in claim 9, wherein the measured seismic trace combined with the estimated amplitude perturbation for the computation of the seismic pseudo-trace is the measured monitor seismic trace, the combination comprising:
modifying the timescale of the measured monitor seismic trace to take into account a variation of speed of propagation of the seismic waves in accordance with the assumption of variation of elastic parameters; and
subtracting the estimated amplitude perturbation from the modified measured monitor seismic trace.

12. The method as claimed in claim 1, wherein the numerical evaluation of the capacity of an assumption of variation of the elastic parameters to account for the evolution between the measured base seismic trace and the measured monitor seismic trace comprises:
estimating a perturbation in amplitude of the measured base seismic trace resulting from the variation of the elastic parameters;
computing a seismic pseudo-trace by combining one of the measured seismic traces with the estimated amplitude perturbation; and
comparing, on a same timescale, the other one of the measured seismic traces with the computed seismic pseudo-trace.

13. The method as claimed in claim 12, wherein the amplitude perturbation is estimated as a function of impedance variations in said permeable layers, deduced from the assumption of variation of the elastic parameters, and from a wavelet representative of an incident seismic signal.

14. The method as claimed in claim 12, wherein the measured seismic trace combined with the estimated amplitude perturbation for the computation of the seismic pseudo-trace is the measured monitor seismic trace, the combination comprising:
   modifying the timescale of the measured monitor seismic trace to take into account a variation of speed of propagation of the seismic waves in accordance with the assumption of variation of elastic parameters; and
   subtracting the estimated amplitude perturbation from the modified measured monitor seismic trace.

15. The method as claimed in claim 1, wherein the positions of the permeable layers along said direction are defined on the basis of a reservoir grid.

* * * * *